United States Patent [19]

Kataoka et al.

[11] Patent Number: 4,881,013
[45] Date of Patent: Nov. 14, 1989

[54] FLASH PHOTOGRAPHIC APPARATUS

[75] Inventors: Hiroyuki Kataoka, Tokyo; Tosiyuki Kumakura, Yokohama, both of Japan

[73] Assignee: Canon Kabushiki Kaisha, Tokyo, Japan

[21] Appl. No.: 88,977

[22] Filed: Aug. 21, 1987

Related U.S. Application Data

[63] Continuation of Ser. No. 761,194, Jul. 31, 1985, abandoned.

[30] Foreign Application Priority Data

| Aug. 6, 1984 | [JP] | Japan | 59-163901 |
| Aug. 6, 1984 | [JP] | Japan | 59-163899 |
| Dec. 11, 1984 | [JP] | Japan | 59-261648 |
| Apr. 2, 1985 | [JP] | Japan | 6069471 |

[51] Int. Cl.$^4$ .................................................. H05B 41/14
[52] U.S. Cl. .................................. 315/241 P; 315/151; 354/415
[58] Field of Search ............... 315/241 P, 241 S, 145, 315/151, 159; 354/413, 415; 363/26

[56] References Cited

U.S. PATENT DOCUMENTS

| 3,953,763 | 4/1976 | Herrick | 315/241 P |
| 4,132,926 | 1/1979 | Ohta et al. | 315/241 S |

FOREIGN PATENT DOCUMENTS

3322461 1/1985 Fed. Rep. of Germany .

*Primary Examiner*—Robert L. Griffin
*Assistant Examiner*—T. Salindong
*Attorney, Agent, or Firm*—Toren, McGeady & Associates

[57] ABSTRACT

In a flash photographing apparatus, a flash device is arranged to slow the rise of flashing characteristic thereof at the initial stage of flashing. To attain this purpose, the electric charge of a first capacitor is impressed via an inductance onto a flash tube at the initial stage of flashing. Following this, the electric charge of a second capacitor is directly impressed on the flash tube without passing through the inductance.

10 Claims, 7 Drawing Sheets

FLASH PHOTOGRAPHIC APPARATUS

This is a continuation of application Ser. No. 761,194, filed July 31, 1985, now abandoned.

BACKGROUND OF THE INVENTION

1. Field of the Invention

This invention relates to a flash photographing apparatus, and more particularly to an improvement on an electronic flash device of the kind arranged to stop a flash tube from flashing when the integrated value of a reflection light from an object to be photographed reaches a predetermined value.

2. Description of the Prior Art

Figure 5:
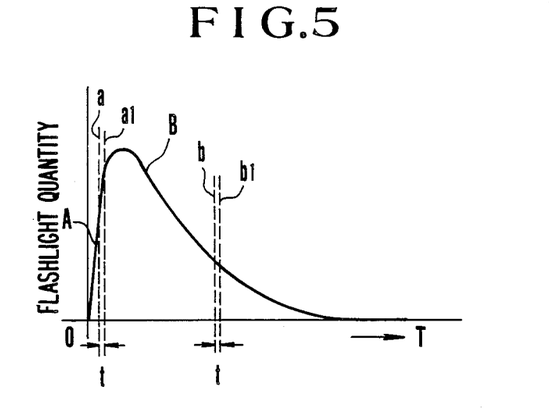
FIGS. 5 and 6 are waveform charts showing the flashing characteristics of the conventional flash devices.
Figure 6:
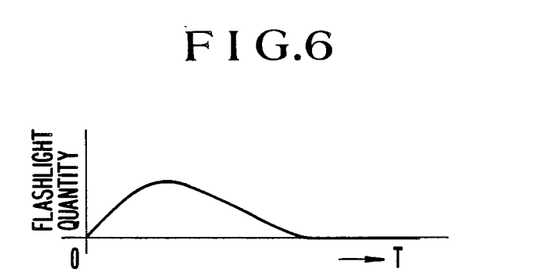

The flashing operation of the conventional devices of the above-stated kind has an extremely steep rising characteristic before it reaches a peak value as represented by FIG. 5 of the accompanying drawings. Therefore, in the event of an electrical delay, which takes place at a light controlling circuit or light quantity limiting circuit or the like during a photographing operation on an object located at a short distance, it has been impossible to obtain an adequate exposure as the flashing stopping time delays due to the electrical delay. In other words, in the case of photographing at a near distance, the flashing operation must be stopped at some point within the steep rise part A. For example, if the flashing operation must be stopped at the point indicated by a broken line "a" in FIG. 5, a time delay "t" takes place to come to another point "al" as indicated by another broken line. This deviation results in an over-exposure. Further, in the case of photographing at distances other than near distances, the flashing operation is stopped at some point on a moderate fall curve B. In that case, therefore, occurrence of the time delay "t" brings about no serious influence on the exposure, as indicated by broken lines "b" and "bl" in FIG. 5. To solve the problem brought about by the steep rise A, it has been attempted to moderate the steep rise by connecting an inductance of a large capacity in series with a flash discharge tube. However, since a considerable amount of resistance is generally included in an inductance, the use of an inductance of a large capacity results in an energy loss caused by the resistance component thereof. As a result, the flashing characteristic becomes as shown in FIG. 6. With an inductance of a large capacity connected, therefore, light quantity becomes insufficient for photographing at a far distance.

SUMMARY OF THE INVENTION

An object of this invention is to provide a flash photographing apparatus which is arranged to have the electric charge of a capacitor discharged to a flash tube via an inductance of a large inductance value at the initial stage of flashing for moderating the steep rise of the flashing characteristic in the initial stage of flashing; and, after that, to have the electric discharge effected to the flash tube via another inductance having a smaller inductance value than the first inductance, so that an overall energy loss due to use of the inductance can be minimized.

Another object of this invention is to provide a flash photographing apparatus wherein there are provided first and second capacitors; the electric charge of the first capacitor is first discharged to a flash tube via a first inductance of a large inductance value; and, following that, the electric charge of the second capacitor is discharged to the flash tube either via a second inductance of a smaller inductance value than that of the first the other inductance or without passing through any inductance, so that the flashing characteristic of the apparatus can exhibit a moderate rise of flashlight in the flashing process and an overall energy loss due to use of the inductance can be held to a minimal degree.

A further object of this invention is to provide a flash photographing apparatus of the above-stated kind wherein there is provided a holding current circuit which supplies a holding current to the above-stated flash tube, so that the flash tube can be triggered even when the charging potential of the first capacitor drops during a continuous photo-taking operation.

It is another object of this invention to provide a flash photographing apparatus wherein the electric charge of the above-stated first capacitor is used for preliminary flashing.

It is a further object of this invention to provide a flash photographing apparatus wherein preliminary flashing is carried out by discharging the electric charge of the above-stated first capacitor via the inductance of a large inductance value; and, after that, main flashing is carried out with the electric charge of both the first and second capacitors.

It is a still further object of this invention to provide a flash photographing apparatus of the above-stated kind, wherein there is arranged voltage impressing means which makes the main flashing always feasible by applying a sufficient voltage to the flash tube even in case where the electric charge of the first capacitor is used up for the preliminary flashing process.

These and further objects and features of the invention will become apparent from the following detailed description of preferred embodiments thereof taken in connection with the accompanying drawings.

DETAILED DESCRIPTION OF THE PREFERRED EMBODIMENTS

Embodiments of this invention are arranged as described below with reference to the accompanying drawings.

Figure 1:
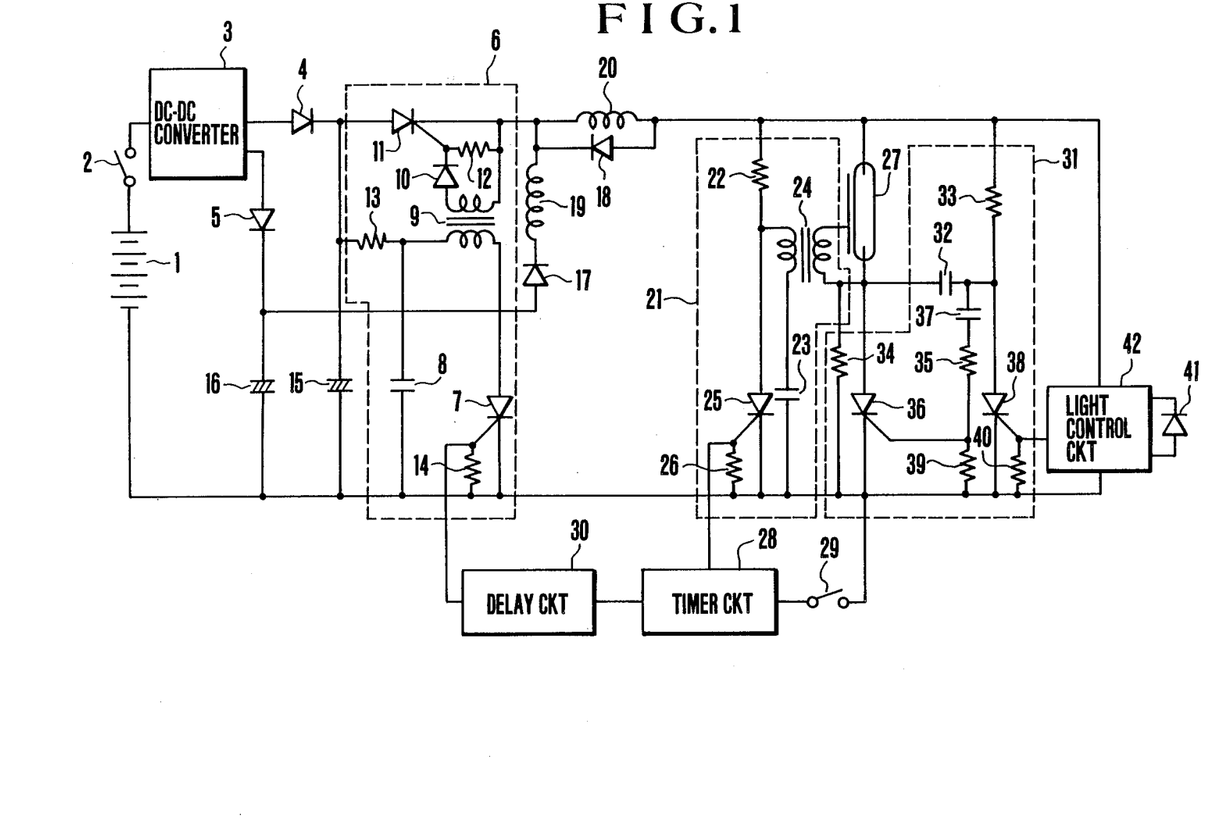
FIG. 1 is a circuit diagram showing a flash device arranged according to this invention as an embodiment thereof.

FIG. 1 is a circuit diagram showing an embodiment of this invention. The illustration includes power source battery 1; a power supply switch 2; a DC-to-DC converter 3 which is arranged to boost a DC voltage; diodes 4 and 5; a switching circuit 6 consisting of a thyristor 7, a capacitor 8, a pulse transformer 9, a diode 10, another thyristor 11 and resistors 12, 13 and 14; a capacitor 15 which is of a large capacity and is arranged to cause a flash tube 27 to flash; a capacitor 16 which is of a small capacity and is arranged to be used for the initial stage of flashing of the flash tube 27; diodes 17 and 18; an inductane 19 which is of a large capacity and is connected in series with the capacitor 16 of a small capacity; an inductance 20 which is of a small capacity; a known trigger circuit 21 consisting of a resistor 22, a trigger capacitor 23, a trigger transformer 24, a trigger thyristor 25 and a resistor 26; the flash tube 27; a timer circuit 28 which produces a high level signal over a predetermined period when a synchronizing contact 29 turns on; a delay circuit 30 which turns the thyristor 7 on rendering the switching circuit 6 operative after the lapse of a predetermined period of time from receipt of the high level signal from the timer circuit 28; and a light quantity control circuit 31 consisting of a commutation capacitor 32, charging resistors 33 and 34 for the commutation capacitor 32, a capacitor 37 connected to the gate of a main thyristor 36 via resistor 35, and the main thyristor 36. The circuit 31 further consists of an auxiliary thyristor 38 and resistors 39 and 40. A photosensitive light receiving element 41 is arranged to receive a reflection light from an object to be photographed. The embodiment is further provided with a known light control circuit 42.

Figure 2:
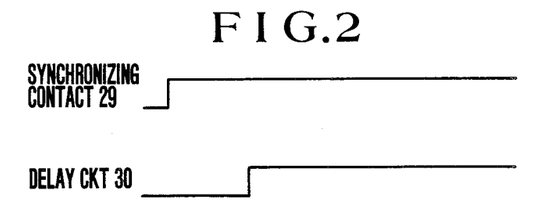
FIG. 2 is a waveform chart showing the operation of the flash device of FIG. 1.
Figure 3:
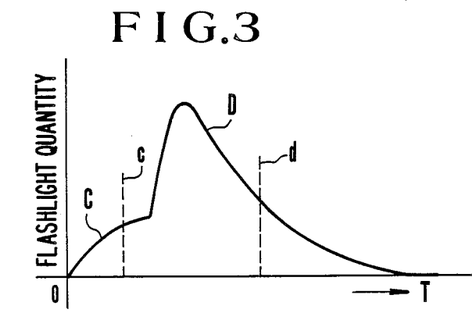
FIG. 3 is a waveform chart showing the flashing characteristic of the flash device of FIG. 1.

The operation of the embodiment is as follows: Referring to FIG. 2, when the synchronizing contact 29 turns on, a high level signal is produced from the timer circuit 28 for a predetermined period of time. The high level signal is applied to the trigger circuit 21. This causes the trigger circuit 21 to operate. The flash tube 27 begins to flash as shown in FIG. 3. In this instance, a discharge path consisting of the capacitor 16, the diode 17, the inductances 19 and 20, the flash tube 27 and the main thyristor 36 is closed. However since the inductance 19 which is of a large capacity, is connected in series with this path, the rise characteristic of the flashlight of the flush tube 27 becomes a moderate curve C as shown in FIG. 3. The light quantity of the flash tube 27 comes within the range as indicated by the portion of the curve C for normal near distance photographing. Meanwhile, the high level signal produced from the timer circuit 28 is also supplied to the delay circuit 30. Then, after the lapse of a predetermined period of time, the delay circuit 30 supplies the high level signal to the switching circuit 6 as shown in FIG. 2. This causes the switching circuit 6 to operate. The thyristor 11 turns on. Then, in addition to the above-stated discharge path, another discharge path including the capacitor 15, the thyristor 11, the inductance 20, the flash tube 27 and the main thyristor 36 closes with the thyristor 11 turned on. As a result of this, it is only the inductance 20 of the smaller capacity that is connected. Therefore, the flashing characteristic of the flash tube becomes steep before it reaches a peak and then slowly fall thereafter as represented by a curve portion D in FIG. 3.

In the case of a near distance photographing operation, a flash stop signal is supplied from the light control circuit 42 to the light quantity control circuit 31 at a point defined on the curve portion C by a broken line "c". However, since the curve portion C is moderately rising by virtue of the large capacity inductance 19, the electrical delay of the light control circuit 42, etc., never causes an over-exposure even if the flash stopping time of the flash tube 27 is somewhat delayed due to the electrical delay of the light control circuit 42, the light quantity control circuit 31, etc., as mentioned in the foregoing.

In the event of a far distance photographing operation, the flash stopping signal is produced at a point defined on the curve portion D by another broken line "d", for example. In this case, the ratio of an error of light quantity, caused by the delay of the flash stopping time, to the total light quantity is small. Therefore, as a practical matter, it is possible to disregard an influence of the error of light quantity. Further, at that point of time, the small capacity inductance 20 comes to work for the flashing operation with the large capacity capacitor 15 connected to the inductance 20. This ensures sufficient light quantity.

Figure 4:
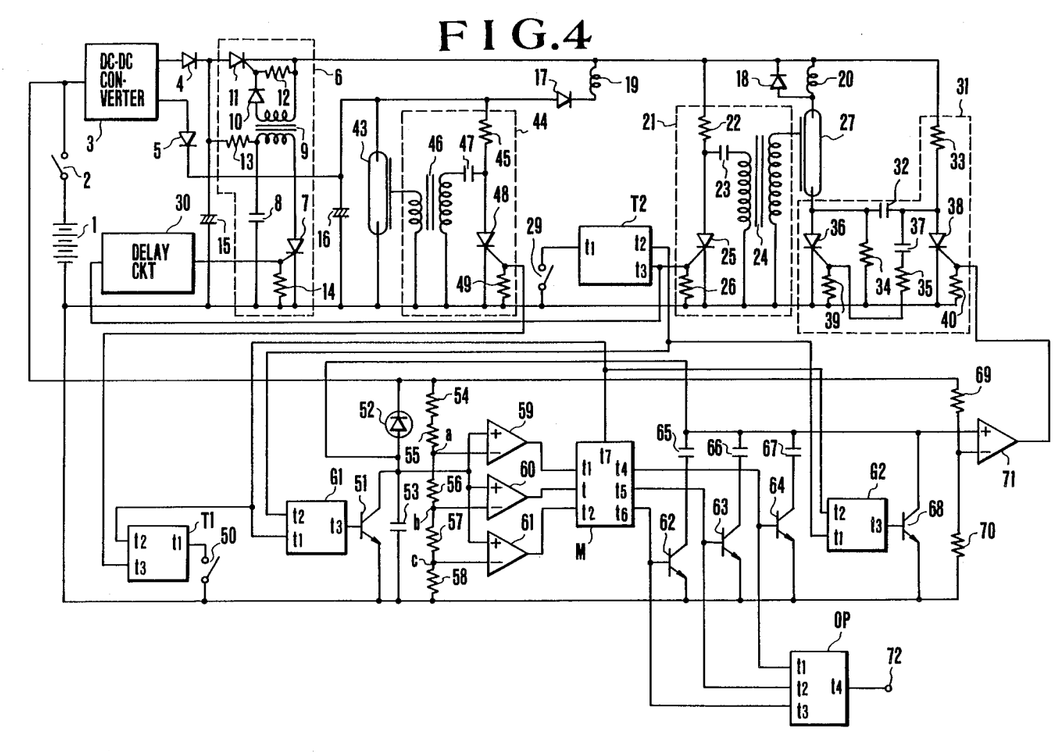
FIG. 4 is a circuit diagram showing a flash device arranged as another embodiment of this invention.

FIG. 4 shows another embodiment of the invention in a circuit diagram. In FIG. 4, the same reference numerals as those of FIG. 1 is used for denoting the same elements. The embodiment includes a preliminary light emitting flash tube 43 arranged to emit infrared rays by using the charge voltage of the capacitor 16; a known trigger circuit 44 consisting of a resistor 45, a trigger transformer 46, a trigger capacitor 47, a trigger thyristor 48 and a resistor 49; a switch 50 which is arranged to turn on in response to a first stroke of operation on a shutter release button; a timer circuit T1 for preliminary light emission or flashing; another timer circuit T2; a gate circuit G1 arranged to turn off a transistor 51 in response to a high level signal coming from the timer circuit T1 or T2; a light receiving element 52 arranged to receive a reflection light coming from an object; an integrating capacitor 53 arranged to be charged with a photocurrent coming from the light receiving element 52; voltage dividing resistors 54, 55, transistors 62, 63 and 64; integrating capacitors 65, 66 and 67; a gate circuit G2; a transistor 68 arranged to be turned on and off by the output of the gate circuit G2; voltage dividing resistors 69 and 70; a comparator 71; an aperture control signal generating circuit OP; and a terminal 72 arranged to produce the aperture control signal and supplies it to a camera body. This embodiment operates as described below:

When the power supply switch 2 turns on, the capacitor 16 is charged by the DC-to-DC converter 3 with a sufficient voltage for causing the preliminary light emitting flash tube 43 to emit the infrared rays. Next, when the switch 50 turns on, high level signals are produced from the terminals t2 and t3 of the timer circuit T1 over a predetermined period of time. With the high level signal produced from the terminal t3, the trigger circuit 44 begins to operate. The preliminary light emitting flash tube 43 then begins to emit the infrared rays. Meanwhile, when the high level signal from the terminal t2 is supplied to the terminal t1 of the gate circuit G1, a low level signal is supplied from the terminal t3 of the gate circuit G1 to the transistor 51 to cause it to turn off. With the transistor 51 turned off, the integrating capacitor 53 is enabled to be charged. The light receiving element 52 photoelectric converts the reflection light received from the object. The integrating capacitor 53 is charged with the photoelectrically converted output of the light receiving element 52. The charge voltage of the integrating capacitor 53 thus becomes a value proportional to an integrated value of the reflection light coming from the object. The potentials at the voltage dividing points, "a", "b" and "c" among the voltage dividing resistors 55–58 are respectively predetermined to correspond to near, medium and far distances of the object to be photographed. For example, in the event of a far object distance, the charge voltage of the integrating capacitor 53 is higher than the potential of the voltage dividing point "c" and lower than the potential of the voltage dividing point "b" at the point of time when the preliminary light emission has come to an end. In this instance, therefore, the comparator 61 alone produces a high level signal. If the object distance is a medium distance, the comparators 61 and 60 produced high level signals respectively. If the object distance is a near distance, all the comparators 59, 60 and 61 produce high level signals respectively. Then, after the lapse of a predetermined period, the output of the terminal t2 of the preliminary light emitting timer circuit T1 changes to a low level signal. When this low level signal comes to the terminal t7 of the memory circuit M, the input levels of the terminals t1, t2 and t3 obtained at that time are stored at the memory circuit M. Then, the memory circuit M turns on the appropriate one of the transistors 62, 63 and 64 according to the input levels thereto. For example, if the outputs of all the comparators 59, 60 and 61 are at high levels, the transistor 64 is turned on to have the integrating capacitor 67 which is for a near distance is selected. Further, with one of the transistors 62, 63 and 64 thus turned on, an aperture control signal as applicable. This aperture control signal is supplied from the terminal 72 to the camera to have the aperture of the lens adjusted according to the object distance.

When the synchronizing contact 29 turns on, high level signals are produced from the terminals t2 and t3 of the timer circuit T2. With the high level signal produced from the terminal t2, the trigger circuit 21 begins to operate. Then, the flash tube 27 begins to flash. In this instance, the discharge path, which includes the capacitor 16, the diode 17, the inductances 19 and 20, the flash tube 27 and the main thyristor 36, closes in the same manner as mentioned in the foregoing. Therefore, by virtue of the action of the inductance 19, the rising characteristic of the flashing operation of the flash tube 27 becomes moderate. Further, when the high level signal is supplied from the terminal t3 of the timer circuit T2 to the delay circuit 30, the delay circuit 30 produces and supplies a high level signal to the switching circuit 6 after the lapse of a predetermined period from the receipt of the high level signal from the terminal t3. The high level signal from the switching circuit 6 turns on the thyristor 11. Then, the discharge path including the capacitor 15, the thyristor 11, the inductance 20, the flash tube 27 and the main thyristor 36 closes. With the path closed, flashing curve of the flash tube 27 becomes also as represented by the curve portion D of FIG. 3 by virtue of the action of the inductance 20 in the same manner as in the case mentioned in the foregoing.

Meanwhile, with the high level signal produced from the terminal t2 of the timer circuit T2, the output of the terminal t3 of the gate circuit G2 becomes a low level signal, which turns off the transistor 68. This renders one of the integrating capacitors 65, 66 and 67 which is selected by the memory circuit M chargeable. The flash light of the flash tube 27 is reflected by the object. The light receiving element 52 receives the reflected light and converts it into a current. One of the integrating capacitors 65, 66 and 67 which is selected by the memory circuit M is charged with this current. When the charge voltage of the selected one of the integrating capacitors 65 - 67 comes to exceed the voltage at the voltage dividing point of the voltage dividing resistors 69 and 70, the comparator 71 produces and supplies a flash stopping signal to the light quantity control circuit 31. In other words, the comparator 71 produces the flash stopping signal which corresponds to a distance to the object at a point defined either by the broken line "c" or the broken line "d" in FIG. 3.

In both of the embodiments shown in FIGS. 1 and 4, the flash light rising characteristic of the flash tube 27 is moderated by the combined use of the small capacity capacitor 16 and the large capacity inductance 19 within the near distance photographing range, that is, during the early period of flashing by the flash tube 27. After that, the flashing operation is carried out by the comb of the large capacity capacitor 15 and the small capacity inductance 20, so that the near distance photographing operation can be accomplished without the fear of an over-exposure. In addition to that advantage, a far distance photographing operation can be accomplished without the fear of insufficiency of light quantity. Further, the arrangement to use the large capacity inductance 19 only at the initial stage of flashing and to use the small capacity inductance 20 thereafter effectively minimize the energy loss which results from the resistance component included in the inductance. For example, assuming that the energy of the small capacity capacitor 16 and that of the large capacity capacitor 15 are in the ratio of 1:9 and that the energy loss due to the small capacity inductance 20 is 0% and the energy loss due to the large capacity inductance 19 is 50%, the energy to be imparted to the flash tube 27 can be expressed as follows:

$$0.5 \times 1/10 + 1 \times 9/10 = 0.95$$

Therefore, in accordance with the arrangement of the embodiment of this invention, 95% of the total energy can be used. Whereas, if the large capacity inductance 19 is used throughout the whole flashing period, it is only 50% of the total energy that can be used. Then, the flashing characteristic becomes as shown in FIG. 6.

In the case of the embodiment shown in FIG. 4, the small capacity capacitor 16 which is used at the initial flashing stage of the flash tube 27 can be utilized also for the preliminary light emission. This arrangement dispenses with use of an additional capacitor specially for the preliminary flashing. It is another advantage of the embodiment that a color balance can be prevented from being lost as the flashing time of the flash tube 27 for near distance photographing is lengthened as shown in FIG. 3.

In the specific embodiments shown in FIGS. 1 and 4, the delay circuit 30 is arranged to turn on the thyristor 11 after the lapse of a predetermined period of time. However, this arrangement may be replaced with another arrangement in which the thyristor 11 is turned on when a drop of the energy of the small capacity capacitor 16 is detected by some other suitable means.

Figure 7:
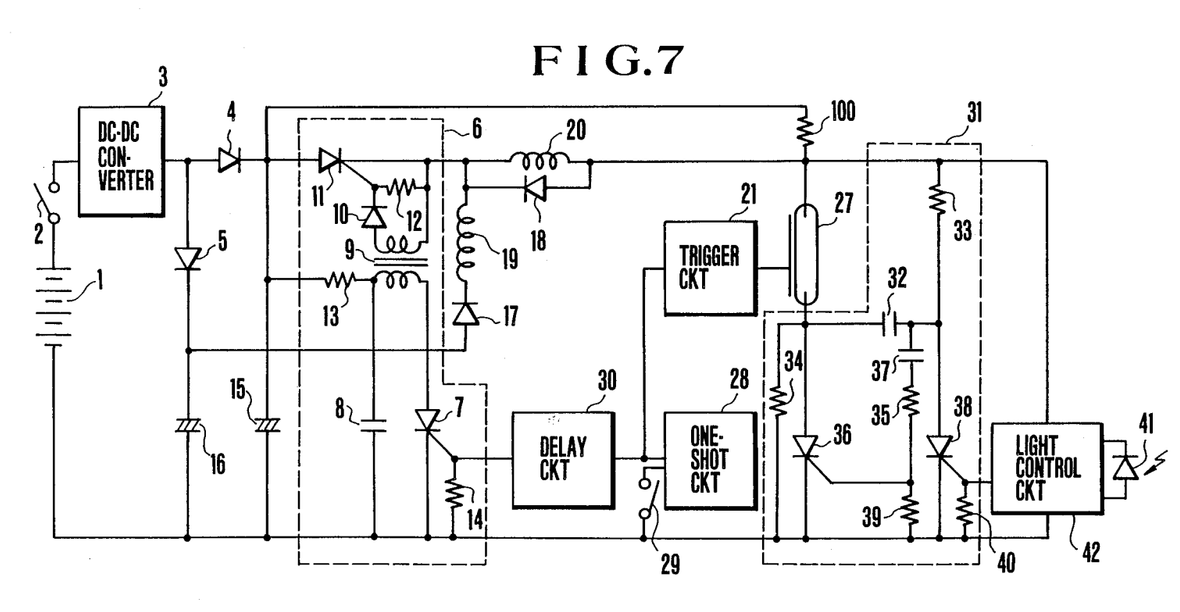
FIG. 7 is a circuit diagram showing a further embodiment of this invention.

While the various advantages of the embodiments of this invention shown in FIGS. 1 and 4 are as mentioned in the foregoing, they have the following problem: In consecutively performing one photographing operation after another, if the first one is a near distance photographing operation, the flash stopping signal comes from the light control circuit 42 to the light quantity control circuit 31 at the initial stage of flashing by the flash tube 27 to bring the flashing process to an end. After that, if the second photographing operation is to be performed within a short ensuing period of time, the flash tube 27 would be unable to flash in response to the action of the trigger circuit 21 thereon because of a considerable degree of decrease in the charge voltage of the capacitor after the first flashing process. In other words, the flash tube 27 does not have a sufficient charge voltage applied between the anode and cathode thereof. While the first flash photographing operation is possible, the second and ensuing flash photographing become impossible without having a sufficiently long interval for recharging the capacitor 16 between one flashing process and another. This problem is solved in another embodiment of this invention which is arranged as described below:

FIG. 7 shows the circuit arrangement of this embodiment. The same reference numerals are used for denoting the same elements as those shown in FIG. 1. This embodiment differs from the embodiment shown in FIG. 1 in that a resistor 100 is connected in series between the large capacity capacitor 15 and the flash tube 27.

With the resistor 100 connected in this manner, even if the charged voltage of the capacitor 16 becomes zero due to the first performance of flash photographing (never happens in actuality), the charged voltage of the large capacity capacitor 15 comes via the resistor 100 to be impressed on the flash tube 27. Therefore, this enables the flash tube 27 to begin to flash even in the event of the second performance of flash photographing within a short period after the first, so that the second and subsequent performances can be accomplished without fail. It is important, however, that the resistor 100 is set at such a resistance value that enables the flash tube 27 to continuously discharge during a period after the synchronizing contact turns on and before the tyristor 11 turns on (irrespective of the charged voltage of the capacitor 16). In other words, when the trigger circuit 21 operates, a voltage value which is sufficient to cause the flash tube 27 to flash is supplied and, after flashing, a sufficient current is supplied for continuous discharge from the flash tube with the resistance value of the resistor 100 appropriately set. To meet this requirement, the resistance value is set, for example, between 500 Ω and 20 KΩ. If the resistance value is too small, the use of the switching circuit 6 would become meaningless. Meanwhile, the diode 17 serves to prevent the charged voltage of the capacitor 15 from flowing to the other capacitor 16 via the resistor 100.

Figure 8:
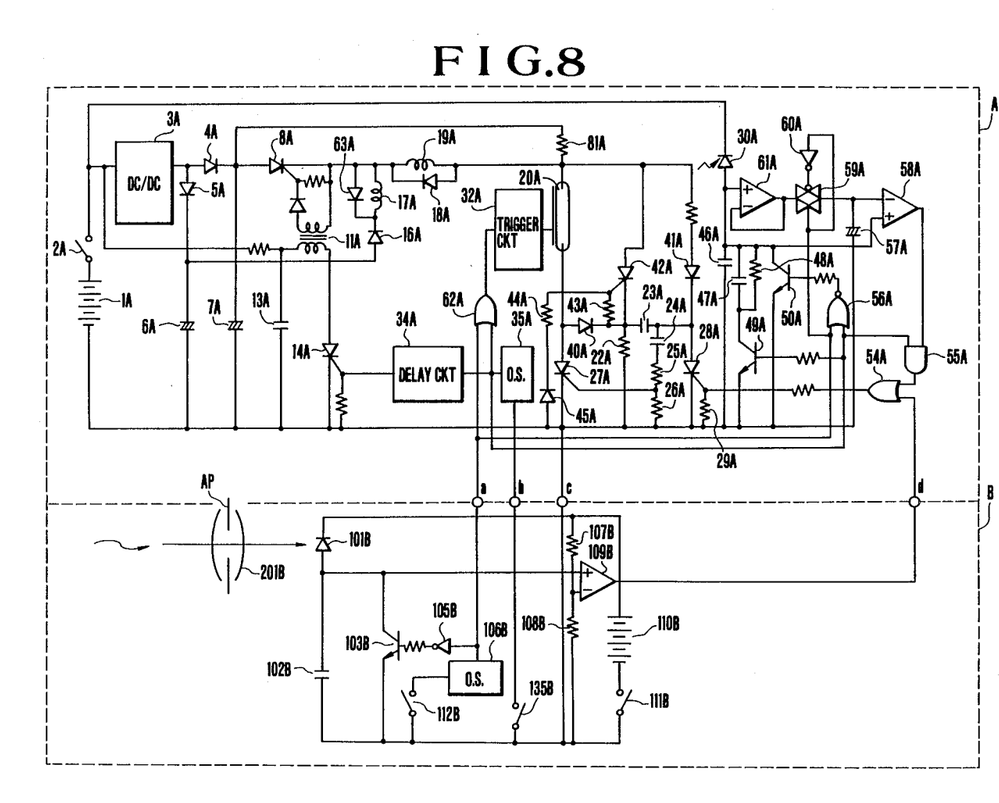
FIG. 8 is a circuit diagram showing a further embodiment of this invention.

FIG. 8 is a circuit diagram showing a flash photographing apparatus arranged as a further embodiment of this invention. The illustration includes a flash device A. The flash device includes a power source 1A; a power supply switch 2A; and a DC-to-DC converter 3A. The converter 3A is arranged to boost the voltage of the power source 1A and has its output terminal connected via diodes 4A and 5A to a capacitor 6A for preliminary flashing and another capacitor 7A which is for flash photographing. The capacity of the capacitor 6A is set at a value approximately 1/10 of that of the capacitor 7A. The flash device further includes a trigger circuit 32A which is arranged to trigger a flash tube 20A. The trigger circuit 32A is connected via an OR gate 62A to one-shot circuits 106B and 35A, respectively. These one-shot circuits 35A and 106B are respectively connected to a synchronizing switch 135B and a preliminary light emitting switch 112B. The one-shot circuit 106B generates a one-shot pulse every time the switch 112B turns on. The one-shot pulse renders the trigger circuit 2A operative for effecting preliminary light emission. Further, when the synchronizing switch 13513 turns on, the one-shot circuit 35A operates to actuate the trigger circuit 32A to cause flashing for a flash photographing operation.

A delay circuit 34A is arranged to delay the output pulse of the one-shot circuit 35A for a predetermined period of time. A thyristor 14A is arranged to turn on in response to the pulse delayed by the delay circuit 34A. With the thyristor 14A turned on, the electric charge of the capacitor 13A is discharged to a primary coil of a transformer 11A. A thyristor 8A is arranged to turn on in response to the output of the transformer 11A.

With the embodiment arranged in the manner as mentioned above, at the time of the preliminary light emission, the electric charge of the capacitor 6A is discharged to the flash tube 20A via the diode 16A, and coils 17A and 19A. In flashing for flash photography, in addition to the discharge of the electric charge of the capacitor 6A, the electric charge of the capacitor 7A is also discharged to the flash tube 20A via the thyristor 8A and the coil 19A. The inductance of the coil 17A is set at a larger value than that of the other coil 19A.

A thyristor 27A is connected in series with the above-stated flash tube 20A. Another thyristor 42A is connected in series with a resistor 22A. This series arrangement is then parallel connected to the series arrangement of the thyristor 27A and the flash tube 20A. The flash device further includes diodes 40A and 45A; resistors 43A, 44A, 25A and 26A; capacitors 23A and 24A; and a thyristor 28A. These circuit elements jointly form a known commutation circuit.

A light receiving element 30A is arranged close to the flash tube 20A to receive a portion of light emitted from the flash tube 20A. The element 30A is connected in series with an integrating capacitor 46A The flash device A includes also a buffer amplifier 61A; an analog switch 59A; and an inverter 60A which is provided for controlling the amplifier 61A and has its input terminal connected to the above-stated one-shot circuit 106B The switch 59A is on only, while the one shot circuit 106B is producing the one-shot pulse output therefrom. With the switch 59A on, the electric charge of the capacitor 46A is transferred to a storage capacitor 57A.

There is provided a comparator 58A which has one input terminal thereof connected to the above-stated capacitor 57A and the other input terminal to the capacitors 46A and 47A. The comparator 58A is thus arranged to compare the voltage stored at the capacitor 57A with the electric charge of the capacitors 46A and 47A The comparator 58A produces a high level output when the two voltage values coincide with each other. An AND gate 55A is arranged to have its input terminals connected to the output terminal of the comparator 58A and that of the one-shot circuit 35A. At the time of flashing for flash photographing, when a high level signal is produced from the comparator 58A, the AND gate 55A allows the high level signal to be supplied via an OR gate 54A to the above-stated thyristor 2. Then, the commutation circuit operates to bring the flashing process to a stop. Further, the OR gate 54A is connected to an output of a comparator 109B. In case of the preliminary light emission, when a high level signal is produced from the comparator 109B, the OR gate 54A allows the above-stated thyristor 28A to be turned on by the high level signal to bring the preliminary light emission to an end.

The flash device is provided further with a NOR gate 56A; a transistor 50A, which is arranged to control the start of integration and is connected in parallel with the capacitors 46A and 47A; and another transistor 49A which is connected in series with the capacitor 47A. As will be further described later herein, at the time of flashing for flash photographing, the transistor 49A turns on to form an integrating circuit in conjunction with the capacitor 46A for the light receiving element 30A. The capacity of the capacitor 46A and that of the capacitor 47A are set to be in the ratio of 1:9.

In FIG. 8, a block B represents the arrangement of the embodiment on the side of the camera. The camera B includes a photo-taking lens 201B; and a light receiving element AP of the so-called TTL light controlling type which is arranged to receive via the lens a reflection light coming from an object as a result of flashing, for example, by having the reflection light reflected by a shutter curtain. The light receiving element 101B is connected to a capacitor 102B for integration. An inverter 105B is connected to the above-stated one-shot circuit 106B. The output terminal of the inverter 105B is connected to the base of an integration start switching transistor 103B. Reference numerals 107B and 108B denote voltage dividing resistors. A comparator 109B is arranged to compare the charge potential of the above-stated integrating capacitor 102B with a reference voltage obtained by means of the voltage dividing resistors 107B and 108B. The camera is provided with a power source 110B; a power supply switch 111B; and terminals "a", "b", "c" and "d" which are arranged to permit the flash device A to be connected to the camera B. However, these terminals "a", "b", "c" and "d" are not necessary in cases where the camera is arranged in one unified body with the flash device.

The embodiment shown in FIG. 8 operates in the following manner: With the power supply switches 111B and 2A of the camera B and the flash device A having been turned on, when an operation member which is disposed on the camera B (not shown) is operated, the switch 112B turns on. With the switch 112B turned on, the one-shot circuit 106B generates a one-shot pulse. Then, the transistor 103B turns off to release the capacitor 102B from a short-circuited state.

Meanwhile, since the power supply switch 2A is on as mentioned above, the capacitors 6A, 7A, 13A, 23A and 24A are all in their charged states.

With the one-shot circuit 106B operated as mentioned above, the one-shot pulse output thus produced comes via the OR gate 62A to the trigger circuit 32A. This triggers the flash tube 20A. A change in potential, which results from the triggering action on the flash tube 20A, is transmitted via the capacitors 23A and 24A to the thyristor 27A to turn it on. Therefore, the electric charge of the capacitor 6A is discharged via the coils 17A, 19A and the thyristor 27A. As a result, the preliminary light emission or flashing is carried out. This light of preliminary flashing is reflected by the object and the reflected light is received by the light receiving element 101B. The incident light on the element 101B is integrated by the capacitor 102B. When the integration value reaches a predetermined value, the comparator 109B produces a high level signal. The high level signal is supplied via the OR gate 54A to the gate of the thyristor 28A. The thyristor 28A turns on.

The electric charge of the commutation circuit is discharged via the thyristor 28A. This turns the thyristor 27A off. At the same time, the electric charge is discharged also via the thyristor 28A, the diode 45A and the resistors 44A and 43A to turn the thyristor 42A on. With the thyristor 42A thus turned on, the flash tube 20A is stopped from flashing.

When the one-shot circuit 106B operates to initiate the preliminary flashing as mentioned above, the pulse signal of the one-shot circuit 106B is transmitted to the NOR gate 56A to turn off the transistor 50A. Therefore, the capacitor 46A is released from a short-circuited state and the quantity of light received by the light receiving element 30A as a result of the preliminary flashing is integrated by the capacitor 46A. As mentioned above, the control over the preliminary flashing light quantity is carried out by receiving the reflection light from the object at the light receiving element 101B which is disposed on the side of the camera B. Therefore, the value integrated by the capacitor 46A through the preliminary flashing comes to represent a flash light quantity required for an adequate exposure.

The analog switch 59A is arranged to on during the time of the above-stated one-shot pulse signal. Therefore, when the pulse output of the one-shot circuit 106B disappears after completion of the above-stated integrating action performed by the capacitor 46A, the analog switch 59A turns off. Then, the transmission of the above-stated integrated value to the capacitor 57A which has been carried on while the switch 59A is on is no longer allowed. As a result, an integrated value of the capacitor 46A which corresponds to a flash light quantity required for an adequate exposure is stored and held at the capacitor 57A.

As mentioned above, the preliminary flashing process enables the capacitor 57A to store a flash light quantity necessary for an adequate exposure. Then, as will be further described later, a flash light quantity is adjusted on the basis of this stored value in carrying out a flash photographing operation.

For the preliminary flashing operation, the capacitor 6A has a discharge path formed through the coils 17A and 19A as mentioned in the foregoing. This discharge path arrangement serves to moderate the rising characteristic of the flashing wave form. Therefore, the flashlight quantity can be accurately adjusted even in the case where an object to be photographed is located at a near distance. At the time of the preliminary flashing, the comparator 109B produces an output when the integrated value of the capacitor 102B reaches a value corresponding to an apposite exposure to bring the preliminary flashing to a stop. For this purpose, the inversion level of the comparator 109B is set, for example, at a value 1/10 of an apposite degree of exposure, so that unnecessary power consumption for the preliminary flashing can be minimized.

Figure 9:
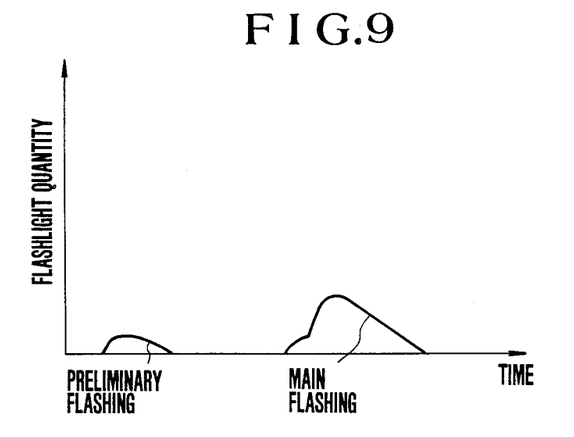
FIG. 9 is a waveform chart showing the operation of the embodiment shown in FIG. 8.

With the leading curtain of a shutter allowed to travel to initiate an exposure by pushing a shutter release button of the camera B after completion of the above-stated preliminary flashing, the synchronizing switch 135B turns on in response to the travel of the leading shutter curtain. This renders the one-shot circuit 35A operative and a pulse output is produced therefrom. The pulse signal thus produced is transmitted via the OR gate 62A to the trigger circuit 32A. The flash tube 20A is then triggered in the manner as described in the foregoing. The electric charge of the capacitor 6A is thus discharged. Further, the pulse output of the above-stated one-shot circuit 35A is transmitted also to the thyristor 14A via the delay circuit 34A. The thyristor 14A then turns on. Therefore, the electric charge kept at the capacitor 13A is discharged to the transformer 11A to turn on the thyristor 8A. This causes the electric charge of the capacitor 7A to be discharged via the thyristor 8A and the coil 19A to the flash tube 20A. Thus, in the case of flashing for flash photography, the electric charge of the capacitor 6A is first discharged via both the large inductance coil 17A and the small inductance coil 19A and, following that, the electric charge of another capacitor 7A is discharged via the small inductance coil 19A. Therefore, as shown in FIG. 9, the rise of the flash light becomes moderate in the same manner as in the case of the preliminary flashing. The light quantity control, in the event of small flash light quantity, can be accurately accomplished in the same manner as in the case of the preliminary flashing process.

In synchronism with the flashing operation for flash photography, the pulse signal of the above-stated one-shot circuit 35A is transmitted to the base of the transistor 49A and also to the base of another transistor 50A via the NOR gate 56A. The transistor 49A turns on and the transistor 50A turns off. As a result, at the time of flash photographing, the integrating circuit for the light receiving element 30A is formed by the parallel connection of the capacitors 46A and 47A. The integrating circuit then performs an integrating action on the quantity of light received by the light receiving element 30A.

The capacity of the capacitor 46A and that of the capacitor 47A are in the ratio of 1:9 as mentioned in the foregoing. Therefore, in the case of flashing for flash photographing, the quantity of light received by the light receiving element 30A is integrated by the capacitor arrangement which has a capacity ten times as much as the capacity arranged for the preliminary flashing. Therefore, at the time of the preliminary flashing, a flash light quantity for an apposite exposure is determined with a level 1/10 of the apposite value which is set as a reference value; timing for bringing the flashing process to a stop and for the storing operation of the capacitor 57A is controlled by means of the comparator 109B; and the capacitor 57A is thus arranged to store a value which is 1/10 of the flash light quantity required for an opposite exposure. Despite of this, the stored value is corrected and the comparator 58A produces a high level signal when the integrated value of the output of the above-stated light receiving element becomes ten times as much as the value stored by the capacitor 57A. This high level signal is transmitted via the AND gate 55A and the OR gate 54A to the gate of the thyristor 28A and then the flashing operation is brought to a stop as mentioned in the foregoing. The flashlight quantity is thus controlled at the time of flash photographing on the basis of the value stored at the capacitor 57A as mentioned above.

In the event that the electric charge of the capacitor 6A is used up at the time of the preliminary flashing process, no flashing would be performed even when the trigger circuit 32A is triggered by the pulse output of the one-shot circuit 35A with the synchronizing contact turned on, because the electric charge of the capacitor 6A has been used up. However, since the capacitor 7A is then connected to the flash tube 20A via the resistor 81A of a high resistance value, a small amount of current is induced by the electric charge of the capacitor 7A to flow to the flash tube 20A to keep the flash tube in a triggered or excited state.

Therefore, the pulse output of the above-stated one-shot circuit 35A is delayed by the delay circuit 34A to turn on the thyristor 8A a predetermined period after the actuation of the trigger circuit 32A. Then, even with a discharge path which includes the thyristor 8A and the coil 19A formed for the electric charge of the capacitor 7A, the flash tube 20A is enabled to flash without fail by the electric charge of the capacitor 7A. This arrangement effectively prevents the trouble that no flashing is performed even with the timing for the triggering action differentiated from the timing for forming the discharge path of the capacitor 7A. Further, while the embodiment is provided with the coil 19A, this coil is not absolutely necessary and of course may be omitted.

Figure 10:
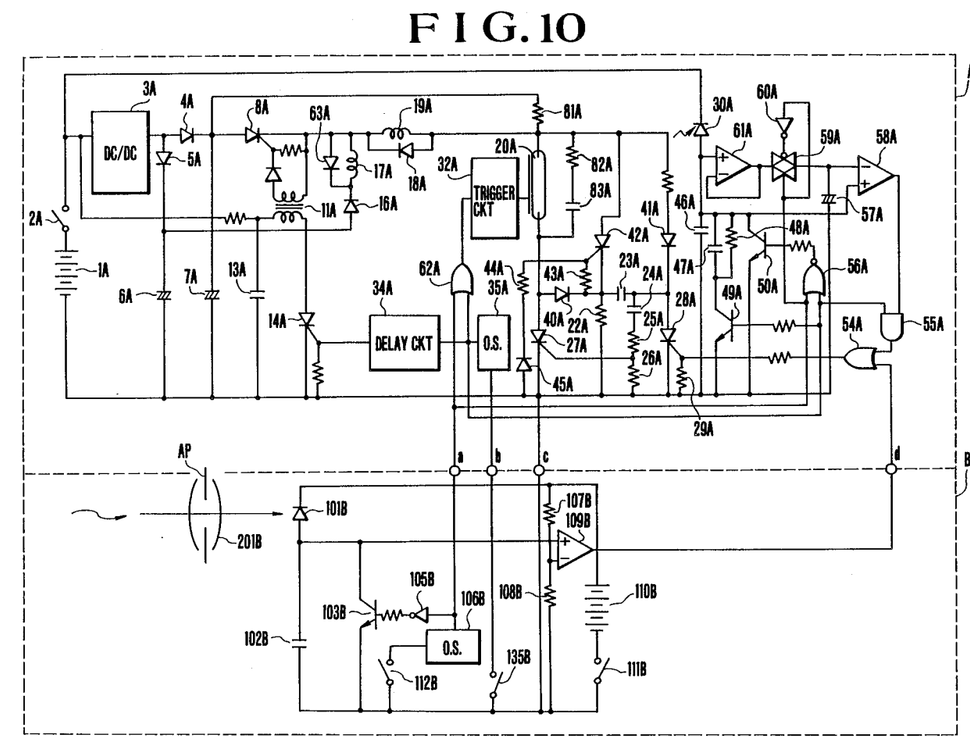
FIG. 10 is a circuit diagram showing a flash device arranged as a still further embodiment of this invention.

FIG. 10 is a circuit diagram showing a further embodiment of this invention. In this embodiment, the flash tube 20A, which is also included in the circuit diagram of the preceding embodiment shown in FIG. 8, is provided with a series connected arrangement of a resistor 82A and a capacitor 83A. This series connected arrangement is parallel connected with the flash tube 20A, so that the main flashing operation of the flash tube 20A can be further ensured to be performed without fail even in cases where the electric charge of the capacitor 6A has been completely discharged for the preliminary flashing operation.

The example of FIG. 10 thus differs from that of FIG. 8 only in that the former is provided with the above-stated resistor 82 and the capacitor 83A while the latter is not provided with them. With the exception of this point, the two embodiments are arranged in the same manner. Therefore, the details of operation of the embodiment of FIG. 10 as a whole are omitted from the following description: With the resistor 82A and the capacitor 83A added, the embodiment has the following advantage: The capacity of the capacitor 83A is arranged to be smaller than that of the capacitor 6A. Therefore, the capacitor 83A is instantaneously charged immediately after the preliminary flashing even if the electric charge of the capacitor 6A is used up for the preliminary flashing. Therefore, in that event, the electric charge of the capacitor 83A thus obtained can be impressed on the flash tube 20A. After the preliminary flashing, even if the synchronizing switch 135B immediately turns on and the trigger circuit 32A becomes operative, the capacitor 83A has been already completely charged by that point of time even if the capacitor 6A has not been charged up to a flashing starting voltage. Then, the electric charge the capacitor 83A is discharged via the resistor 82A to the flash tube 20A to enable it to flash. The length of time for which the flashing operation is retainable by the electric charge of the capacitor 83A is determined by the resistance value of the resistor 82A and the capacity of the capacitor 83A. The flashlight retaining time is preset at a value longer than the delay time of the above-stated delay circuit 34A. Therefore, the flash tube 20A can be kept in a flashing state until the electric charge of the capacitor 7A comes to be discharged. Even in case that a flash photographing operation is initiated immediately after the electric charge of the capacitor 6A has been used up for the preliminary flashing, the flashing operation for photographing can be accomplished without fail.

As described in detail in the foregoing, the flash photographing apparatus according to this invention is capable of improving the flashing characteristic of the initial stage of flashing and is also capable of reducing the energy loss.

In the case of the flash device of the kind arranged to receive a reflected flash light resulting from preliminary flashing and to control the degree of exposure according to the quantity of the reflection light received, as in the case of the embodiments shown in FIGS. 8 and 10, the invented arrangement to moderate the flashing characteristic of the preliminary flashing permits correction of insufficient light receiving characteristic (or responsivity) of the light receiving element by virtue of the light quantity receiving characteristic (or the above-stated flashing characteristic) even in the event of poor responsivity of the light receiving element, so that exposure control can be accurately accomplished.

What is claimed is:

1. A flash photographing apparatus comprising:
   (a) flash means;
   (b) a power source circuit;
   (c) a triggering circuit for triggering said flash means;
   (d) a first capacitor which is connected to said power source circuit and is charged with an electric charge by an output of said power source circuit, said first capacitor being connected in parallel with said flash means;
   (e) a first discharge path for discharging the electric charge accumulated at said first capacitor to said flash means, the discharging operating by said first discharge path being performed when the triggering operation of said triggering circuit is performed;
   (f) a second capacitor which is connected to said power source circuit and is charged with an electric charge by an output of said power source circuit, said second capacitor being connected in parallel with said flash means;
   (g) a second discharge path for discharging the electric charge accumulated at said second capacitor to said flash means; and
   (h) discharge initiating means for discharging the electric charge accumulated at said second capacitor through said second discharge path after discharge of said first capacitor through said first discharge path is started by triggering said flash means by said triggering circuit, and during this discharging of the first capacitor, wherein an inductance value in said first discharge path to said flash means of the electric charge accumulated at said first capacitor is set larger than an inductance value in said second discharge path to said flash means of the electric charge accumulated at said second capacitor.

2. An apparatus according to claim 1, wherein first inductance means and second inductance means are provided in said first discharge path of the electric charge of the first capacitor, and said first inductance means is provided in said second discharge path of the electric charge of said second capacitor.

3. An apparatus according to claim 2, wherein a capacity of said first capacitor is set at a smaller value than a capacity of the second capacitor.

4. A flash photographing apparatus comprising:
   (a) flash means;
   (b) a power source circuit;
   (c) a first capacitor charged with an output of said power source circuit, said first capacitor being connected in parallel to said flash means;
   (d) a second capacitor charged with an output of said power source circuit, said second capacitor being connected in parallel to said flash means;
   (e) a triggering circuit for triggering said flash means;
   (f) a first discharge path for discharging an electric charge accumulated at said first capacitor to the flash means by triggering the flash means by said triggering circuit; and
   (g) a second discharge path through which an electric charge accumulated at the second capacitor is discharged to the flash means after the electric charge accumulated at the first capacitor has started to be discharged to said flash means and during this discharging, wherein an inductance value in said first discharge path is set larger than an inductance value in the second discharge path.

5. A flashing photographing apparatus which makes a preliminary flashing before a main flashing, comprising:
   (a) flash means;
   (b) a power source circuit;
   (c) a first capacitor which has an output of said power source circuit charged therein and is connected in parallel with said flash means;
   (d) a first discharge path for discharging the electric charge accumulated at said first capacitor to said flash means;
   (e) a second capacitor which has an output of said power source circuit charged therein and is connected parallel with said flash means;
   (f) a second discharge path for discharging the electric charge accumulated at said second capacitor to said flash means;
   (g) a preliminary flashing control circuit for impressing the electric charge of the first capacitor to the flash means at a time of the preliminary flashing for effecting the preliminary flashing; and
   (h) a main flashing circuit for first discharging the electric charge of the first capacitor to the flash means, and then after the impressing of the first capacitor electric charge has started, discharging the electric charge of the second capacitor to the flash means, at a time of the main flashing.

6. An apparatus according to claim 5, wherein an inductance value in the discharge path of the electric charge of the first capacitor to the flash means is set at a value higher than an inductance value in the discharge path of the electric charge of the second capacitor to the flash means.

7. An apparatus according to claim 5, wherein said flashing means has first flashing means for a preliminary flashing and second flashing means for a main flashing.

8. An apparatus according to claim 1, further comprising a third capacitor connected in parallel with the flash means.

9. A flashing photographing apparatus, comprising:
   (a) a flash tube;
   (b) a power source circuit;
   (c) a first capacitor in which electric charge is accumulated with an output of said power source circuit;
   (d) a second capacitor in which electric charge is accumulated with an output of said power source circuit;
   (e) inductance means connected between said first capacitor and said flash tube, said inductance means having first and second inductance parts;
   (f) a triggering circuit for triggering the flash tube, wherein the electric charge of said first capacitor is discharged through said first and second inductance parts to the flash tube as the flash tube is triggered; and (g) switching means provided between the second inductance part of said inductance means and said second capacitor, said switching means being turned on as the flash tube is triggered by the triggering circuit for discharging the electric charge of said second capacitor to the flash tube through said second inductance part.

10. A flash photographing system including a camera and a flash device, said flash device makes a preliminary flashing and a main flashing, comprising:
 (a) flash means,
 (b) capacitor means, connected in parallel to said flash means, for accumulating electric charge,
 (c) a synchro-switch operable by operation of a release operation member,
 (d) a triggering circuit for triggering said flash means in response to operation of said synchro-switch and operation of an operation member different from said release operation member to discharge electric charge of said capacitor means to said flash means by the operation of said synchro-switch so as to perform the main flashing, and to perform the primary flashing by operation of said operation member different from the release operation member so that the main flashing and the preliminary flashing are performed independently from each other,
 (e) a memory circuit including a first light receiving member for receiving the flash light of the flash means to memorize an integrated value of the light received by said first light receiving member,
 (f) an integrating circuit including a second light receiving member for receiving light reflected by an object illuminated by the preliminary flashing by said flash means to integrate an output of light received by said second light receiving member.
 (g) a memory control circuit for causing said memory circuit to perform the memory operation when the output of said integrating circuit reaches a predetermined value, and
 (h) a flash stopping circuit for stopping the main flashing by said flash means when an integrated value of an output of light received by said first light receiving member coming from the main flashing by said flash means reaches a value corresponding to the value memorized in said memory circuit.

* * * * *